United States Patent
Chasseguet et al.

(12) 
(10) Patent No.: US 6,428,276 B1
(45) Date of Patent: Aug. 6, 2002

(54) TURBINE WHEEL FOR HYDROKINETIC COUPLING APPARATUS, MADE OF PLASTIC MATERIAL

(75) Inventors: Gustave Chasseguet, Taverny; Frédéric Sauvage, Le Kremlin Bicetre; Philippe Cossonniere, Jouy en Josas, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/508,004
(22) PCT Filed: Jul. 7, 1999
(86) PCT No.: PCT/FR99/01698
§ 371 (c)(1), (2), (4) Date: May 15, 2000
(87) PCT Pub. No.: WO00/01961
PCT Pub. Date: Jan. 13, 2000

(30) Foreign Application Priority Data

Jul. 7, 1998 (FR) .............................. 98 08674
May 5, 1999 (FR) .............................. 99 05724

(51) Int. Cl.[7] .................................. B63H 1/16
(52) U.S. Cl. ....................................... 416/180
(58) Field of Search .................. 416/180, 197 C, 416/213 R, 241 A, 229 R, 229 A, 230; 415/214.1, 915; 192/3.28, 3.29, 3.31, 3.3

(56) References Cited

U.S. PATENT DOCUMENTS

| | | | | |
|---|---|---|---|---|
| 4,584,835 A | | 4/1986 | Nishi | |
| 5,109,604 A | * | 5/1992 | Koebele | 29/889.5 |
| 5,113,654 A | * | 5/1992 | Sahashi | 60/330 |
| 5,226,807 A | * | 7/1993 | By et al. | 416/180 |
| 5,465,575 A | * | 11/1995 | Shimmell | 60/345 |
| 5,505,590 A | * | 4/1996 | Dohring | 416/180 |
| 5,507,622 A | | 4/1996 | Avny | |
| 5,518,368 A | | 5/1996 | Egert | |
| 5,706,656 A | * | 1/1998 | Hinkel | 60/345 |
| 5,720,595 A | | 2/1998 | Avny | |
| 5,737,836 A | | 4/1998 | Finn et al. | |
| 6,024,538 A | * | 2/2000 | Tanishiki et al. | 416/197 C |

* cited by examiner

Primary Examiner—F. Daniel Lopez
Assistant Examiner—James M McAleenan
(74) Attorney, Agent, or Firm—Liniak, Berenato, Longacre & White

(57) ABSTRACT

The invention concerns a hydrokinetic coupling apparatus comprising a turbine wheel capable of being interlocked with a driven shaft and housed in an impulse starter wheel with which it can co-operate for hydrokinetic transmission of a torque to said driven shaft, from an input shaft capable of being interlocked with said impulse starter wheel, the turbine wheel and/or the impulse starter wheel being constituted in the form of a wheel (1) including an external doughnut-shaped part (3) fixed on a hub (2) and blades (4) integral with said external doughnut-shaped part (3) and optionally with an internal doughnut-shaped part (8). Said blade wheel (1) is at least partially moulded in one or several parts in synthetic material, in particular a thermoplastic material, a thermosetting material or a synthetic material alloy, said materials being reinforced with resistant fibres.

21 Claims, 16 Drawing Sheets

TURBINE WHEEL FOR HYDROKINETIC COUPLING APPARATUS, MADE OF PLASTIC MATERIAL

INTERNATIONAL PATENT APPLICATION NO. PCT/FR99/01698, PUBLICATION NO. WO00/01961

Figure 1:
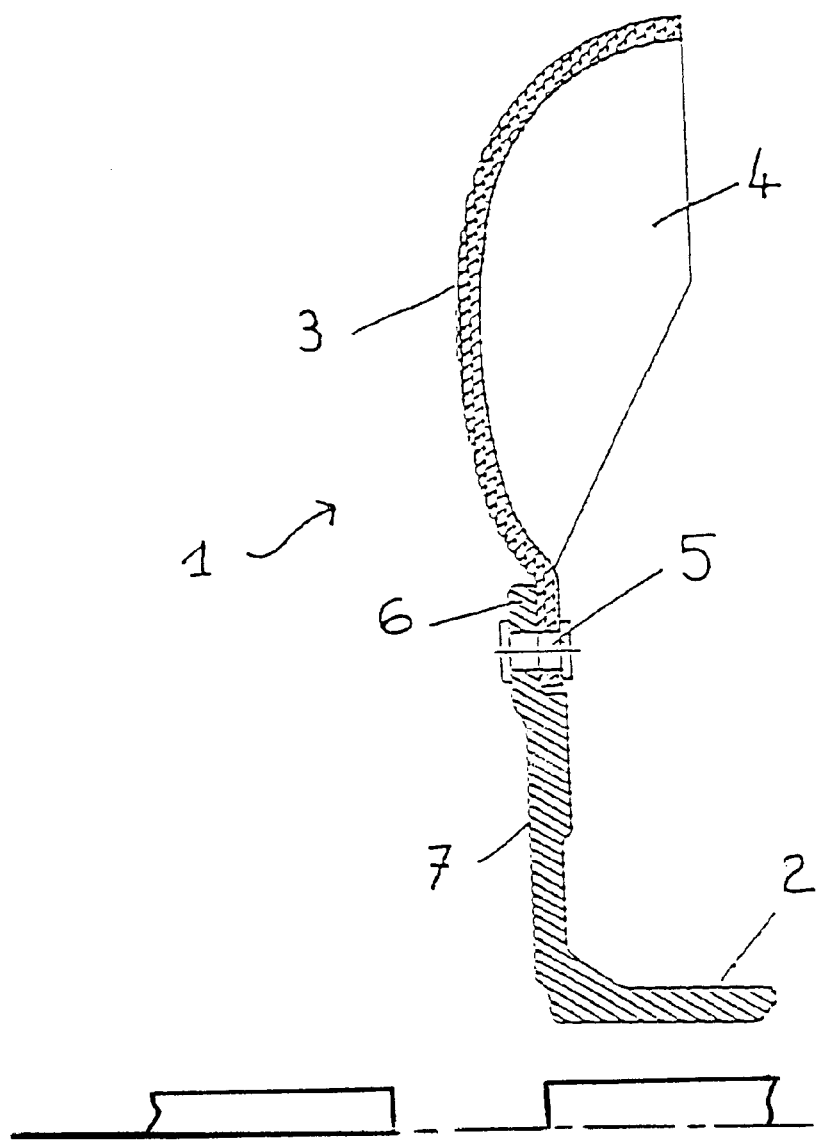

The present invention relates to a hydrokinetic coupling apparatus with a lock-up clutch, of the type which is described in French patent application No. 98/04216 of Mar. 31, 1998.

More precisely, such a hydrokinetic coupling apparatus comprises a turbine wheel which can be coupled to a driven shaft and which is contained within an impulse wheel casing with which it is able to cooperate, for hydrokinetically transmitting a torque to the said driven shaft, from a driving shaft which is able to be coupled with the said impulse wheel, the turbine wheel and/or the impulse wheel being made in the form of a wheel which comprises an outer toroidal portion fixed on a hub, together with blades fixed to the said outer toroidal portion, and possibly an inner toroidal portion.

The operation of such a hydrokinetic coupling apparatus is well known, and will only be repeated below by way of reminder.

Hydrokinetic coupling apparatus of the above type can be applied in particular to motor vehicles, and, as is known in such applications, reduction of the number of components, and saving of weight, are constant concerns with a view to obtaining a cost advantage. More precisely, the invention concerns the construction of a wheel which includes an outer and/or an inner toroidal portion, together with blades which are fixed thereto, the said bladed wheel being able to be used, in a hydrokinetic coupling apparatus of the kind in question, as either an impulse wheel or a turbine wheel, being for example moulded in a synthetic material. In that document FR98/04216, the bladed wheel is made in three parts. It is desirable to simplify this wheel.

Therefore, the invention relates, apart from the construction of this bladed wheel and its different parts, to the construction of the said inner toroidal portion, the assembly of the outer and inner toroidal portions together by means of the blades, the means for coupling the outer toroidal portion to the hub, and finally the assembly of the said bladed wheel to the cover plate in the case where it is an impulse wheel, the various objects of the invention being in all cases to obtain:

- a reduction in weight with synthetic materials that replace steel,
- a reduction in cost, with simplification of the manufacture of a turbine or impulse wheel in one or two pieces, in particular by reduction in the number of operations during the manufacturing process, as compared with the case where these components are made of steel,
- an improvement in regard to fluid losses as compared with a conventional steel product (leaks between the blades and the toruses), and
- a gain in output for the apparatus, with moulding of the turbine or impulse wheel blades enabling a more complex form to be obtained in the blades, leading to improved flow of the fluid.

In accordance with a main arrangement of the invention, a hydrokinetic coupling apparatus of the type defined at the beginning of this document is characterised in that the blades and the toroidal portion are moulded in one piece in a synthetic material, which consists of a thermoplastic material, a thermosetting material, or an alloy of synthetic materials, the said materials being capable of being reinforced with strengthening fibres.

Preferably, the said strengthening fibres are glass fibres, "Kevlar" fibres, etc.

Preferably, the moulded turbine wheel has a thickened peripheral portion which enables it to contain arched seatings for the springs which couple it with the clutch disc.

Thanks to the invention, a sub-assembly consisting of the blades and the toroidal portion is obtained in a simple and inexpensive way, which enables the number of components to be reduced and enables a sub-assembly to be easily made in synthetic material, given that it is very difficult to make such a wheel, especially a turbine wheel, integrally.

In this connection, the mould is then very complex. Furthermore, the blades can take a more complex form and accordingly give better performance from the dynamic point of view.

Thanks to the invention, in one embodiment the wheel does not have an inner toroidal portion.

In other embodiments a stabilising hub, separate from the toroidal portion, is provided on the free side of the blades for stabilising the latter. This arrangement enables any distortion of the blades to be avoided in operation.

The means consists of a crown or a toothed disc, which may or may not be of profiled form, for maintaining the spacing between the blades and stabilising these latter.

In another version, the means consists of the other toroidal portion.

The said other portion may be of metal or of synthetic material.

In one embodiment, the blades are inclined so as to permit stripping from the mould with helical relative movement between the mould and the component.

This operation can easily be carried out.

Where the blades are straight, stripping from the mould may easily be carried out axially.

The toroidal portion made by moulding integrally with the blades may be the inner toroidal portion or the outer toroidal portion.

In another version, the blades are formed partly from the inner toroidal portion and partly from the outer toroidal portion, and are then assembled together in the region of their free ends, for example by adhesive bonding, or indirect application of heat, for example by laser welding.

It is thus possible to obtain blades of more complex forms, with even better performance from the hydraulic point of view. Various ways of carrying out the invention in practice will now be described by way of example, not in any way limiting, with reference to FIGS. 1 to 12 and 14 of the attached drawings, all of which are views in axial half section of a bladed wheel in accordance with the invention, which is adapted to constitute an impulse wheel or a turbine wheel in a hydrokinetic coupling apparatus, and FIG. 13 being a perspective view of the assembly consisting of the blades and outer torus of FIG. 1, while FIG. 15 is a view of such a wheel in partial axial cross section.

FIG. 1 shows an embodiment in which the bladed wheel, for example a turbine wheel 1, is fixed to a steel hub 2 and comprises a toroidal outer envelope or portion 3, to which the blades 4 are fixed, the assembly 3, 4 being of synthetic material moulded in one piece and secured by a crown of rivets 5 (or bolts) on a thin outer peripheral portion 6 of a radial plate portion 7 of the hub. The hub 2 is splined internally for coupling it in rotation to the driven shaft. The hub 2 constitutes the output element of the hydrokinetic coupling apparatus.

Figure 2:
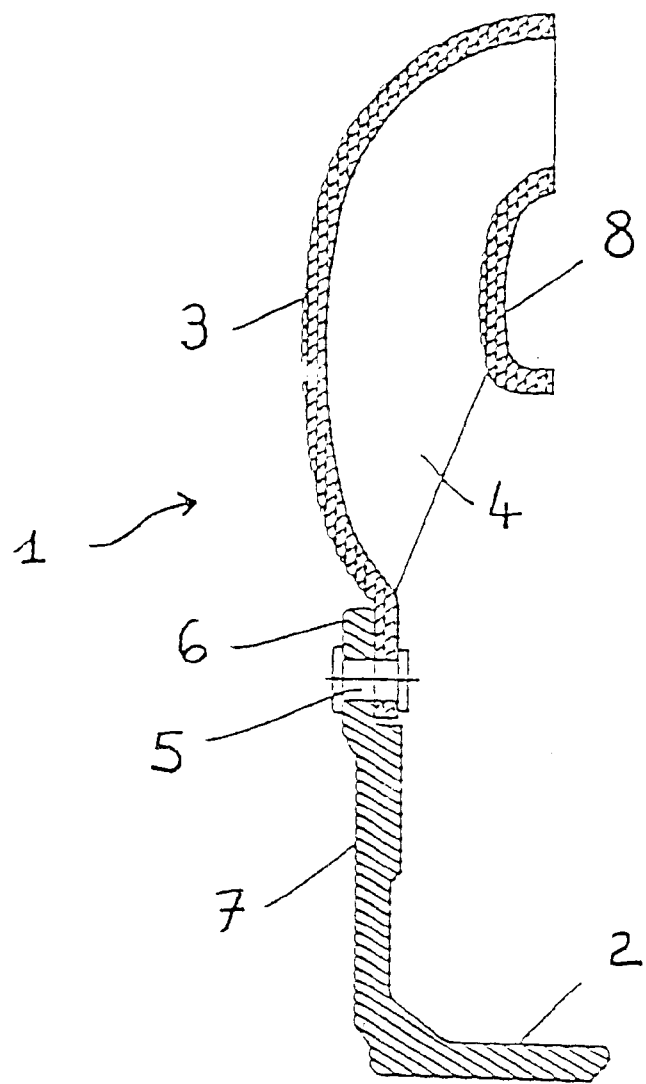

FIG. 2 shows a similar embodiment, in which those references which are common have the said meaning as in FIG. 1. The blades wheel includes, in addition, an inner toroidal portion 8, which is conventional in this example and which is for example of synthetic material, being fixed on the outer toroidal portion 3 by means of the blades 4, in the way which will be explained later herein, so as to secure the said blades 4 together on the side opposite the toroidal outer portion 3. The inner toroidal portion 8 therefore constitutes a stabilising means arranged on the free side of the blades for stabilising the latter and maintaining the spacing between the latter.

Figure 3:
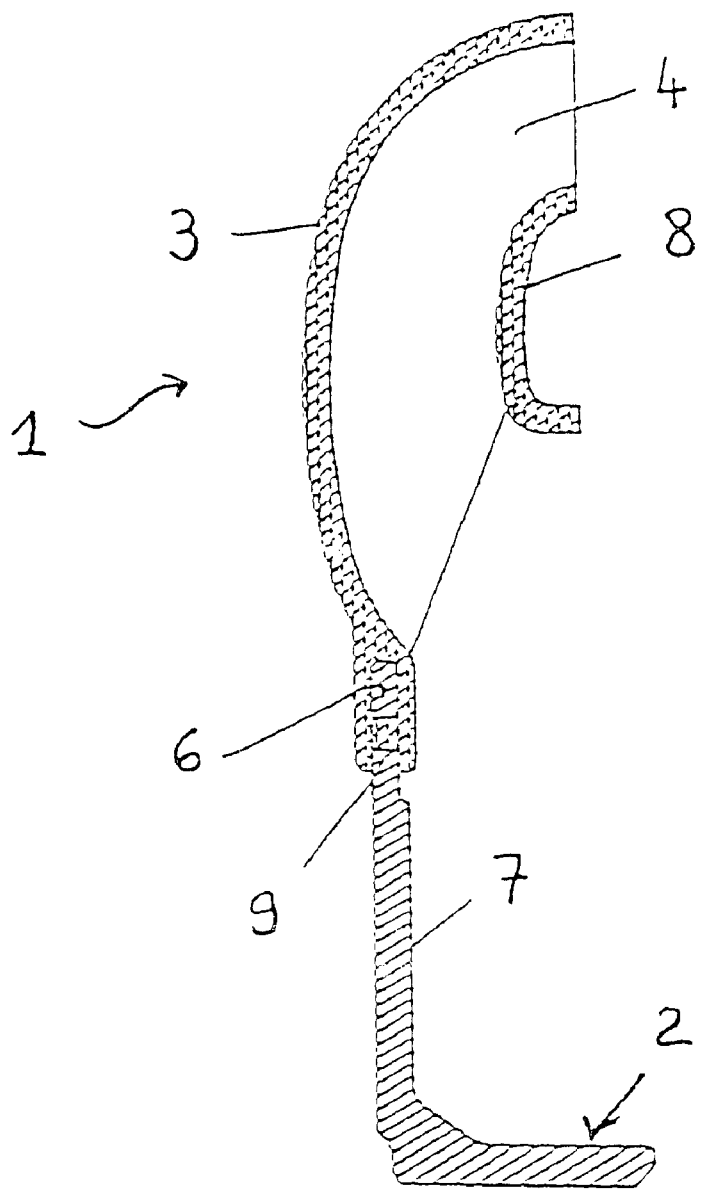

FIG. 3 shows a variant of the embodiment of FIG. 2, in which, in order to avoid fastening by means of rivets or bolts, the steel radial plate 7 of the hub 2 includes, in its thin peripheral portion 6 for example, a set of holes 9 which are spaced apart at regular intervals and which, during the moulding operation, are filled with the synthetic material of the outer toroidal portion 3, whereby the latter is for example formed by applied moulding in a manner known per se.

Figure 4:
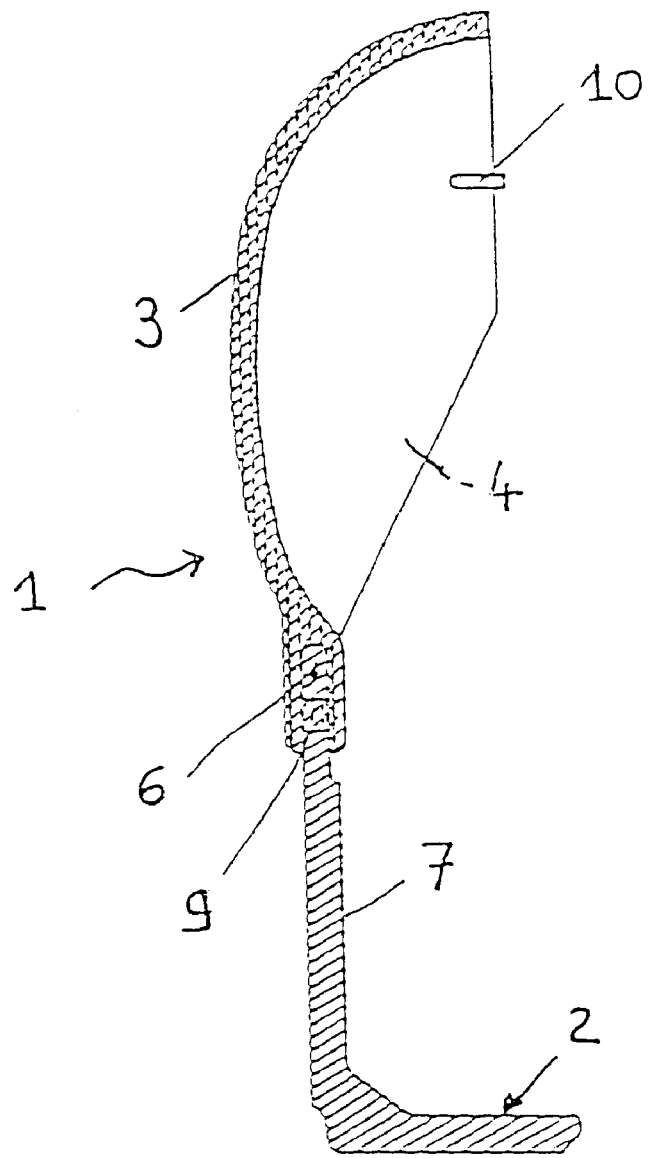
Figure 5A:
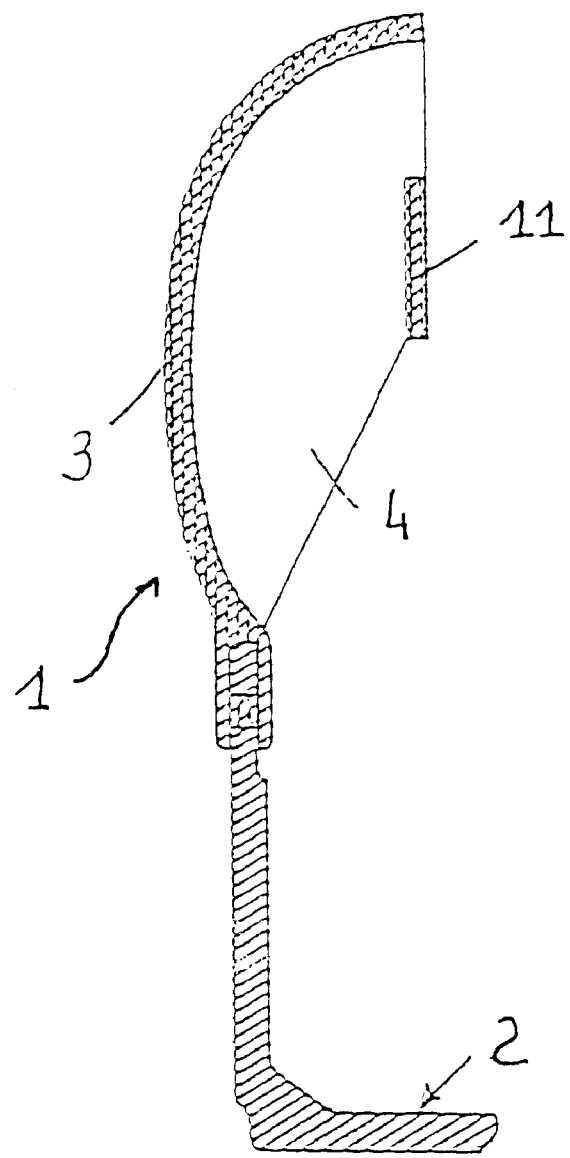
Figure 5B:
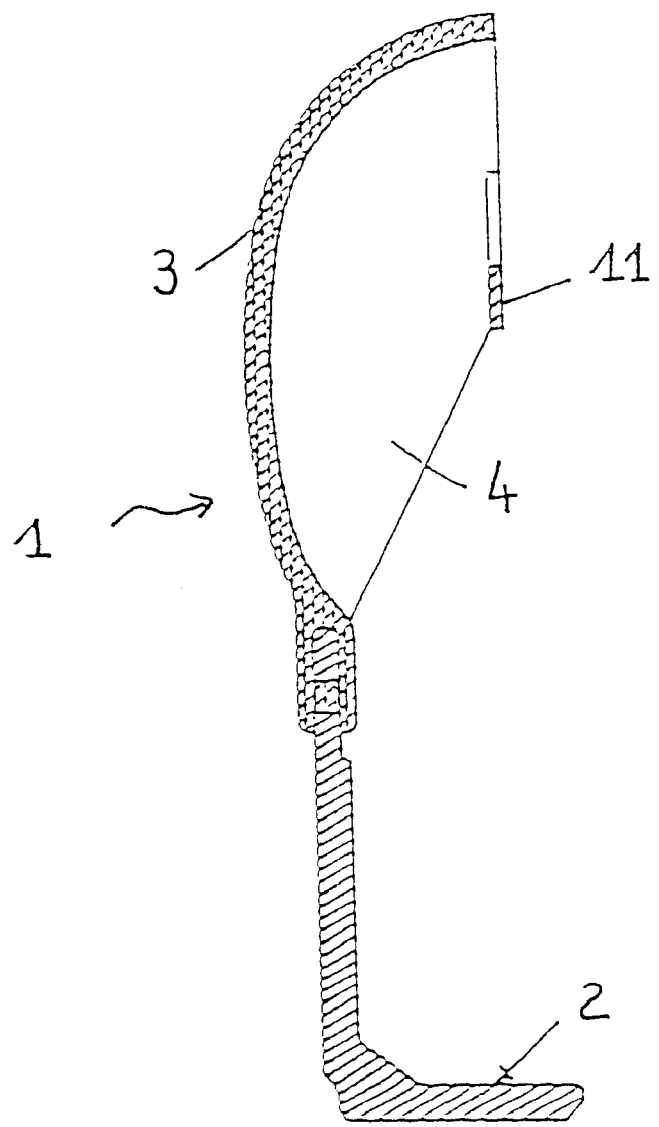
Figure 6:
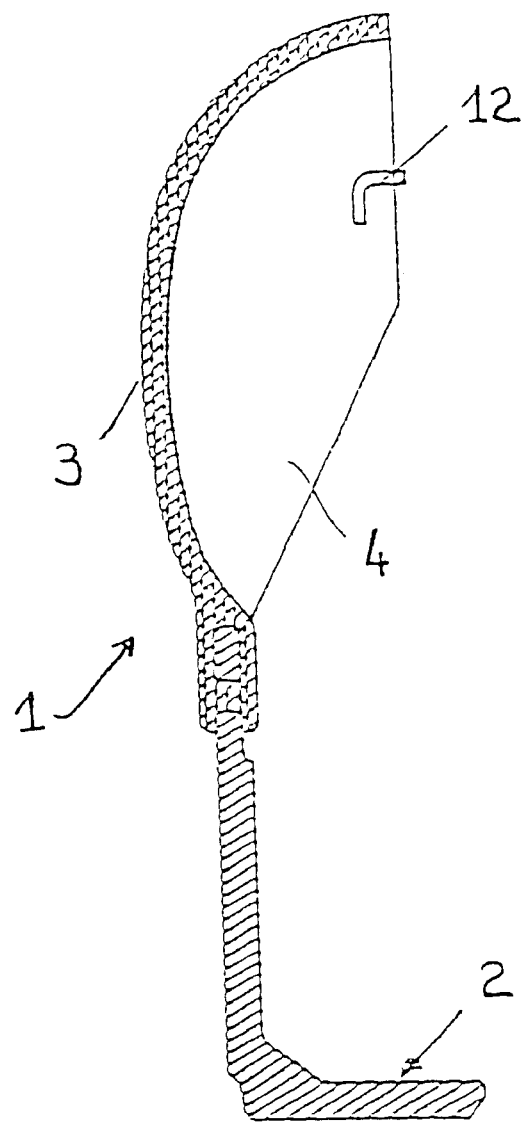

FIGS. 4 to 6 show the same way of fastening on the hub, with, in addition, variants in which the retention of the blades 4 on their free side, on the opposite side to the outer toroidal portion 3, can be obtained by means of a toothed crown 10 of synthetic material or steel (FIG. 4), a toothed disc 11 of synthetic material or steel (FIGS. 5a, 5b), or again, by a profiled toothed crown 12, again of synthetic material or steel (FIG. 6). This crown or disc arranged on the free side of the blades constitutes the stabilising means mentioned above.

As can be seen in FIG. 4, the crown 10 is oriented axially, and is in the form of a comb, the teeth of which constitute spacers between the blades 4 so as to stabilise the latter. In FIGS. 5a and 5b, the disc 11 is also in the form of a comb, with teeth between the blades as in the crown 10, but the disc extends transversely. In FIG. 6, the crown 10 has an L-shaped cross section and accordingly has teeth which are oriented transversely between the blades 4 and are joined to an axially oriented continuous portion such as the crown 10.

In all the foregoing embodiments, it can be seen that the outer toroidal portion 3 and the blades 4 are moulded in one piece in a synthetic material. As mentioned above, the material may be a thermoplastic material, a thermosetting material, or a mixture of synthetic materials, and these materials may be reinforced with strong fibres, especially of glass, carbon, "Kevlar", and so on.

Figure 7:
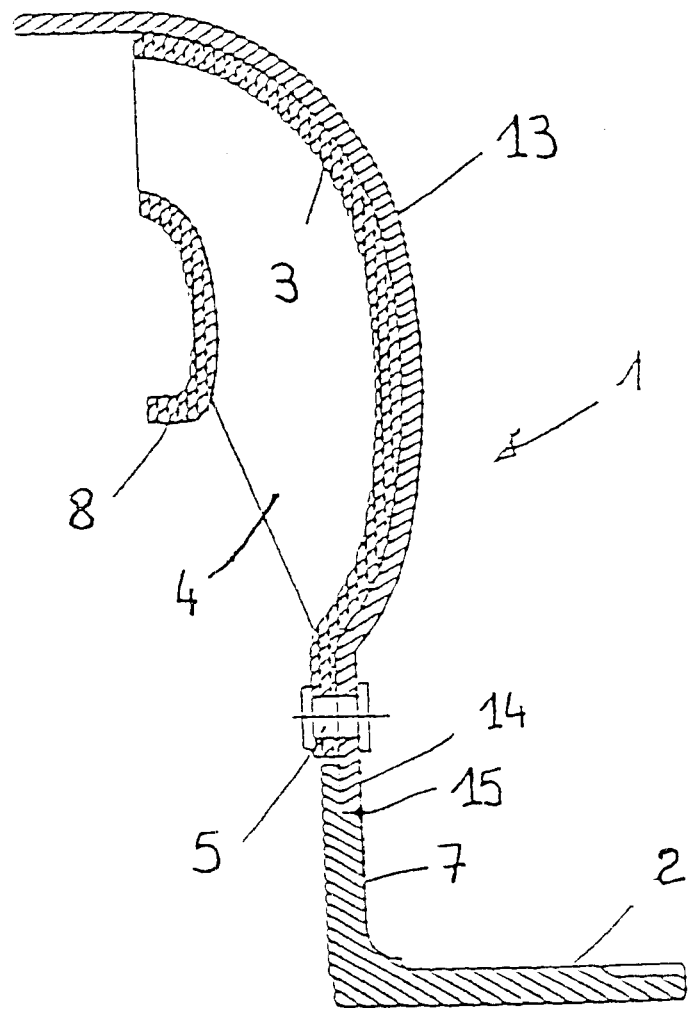
Figure 8:
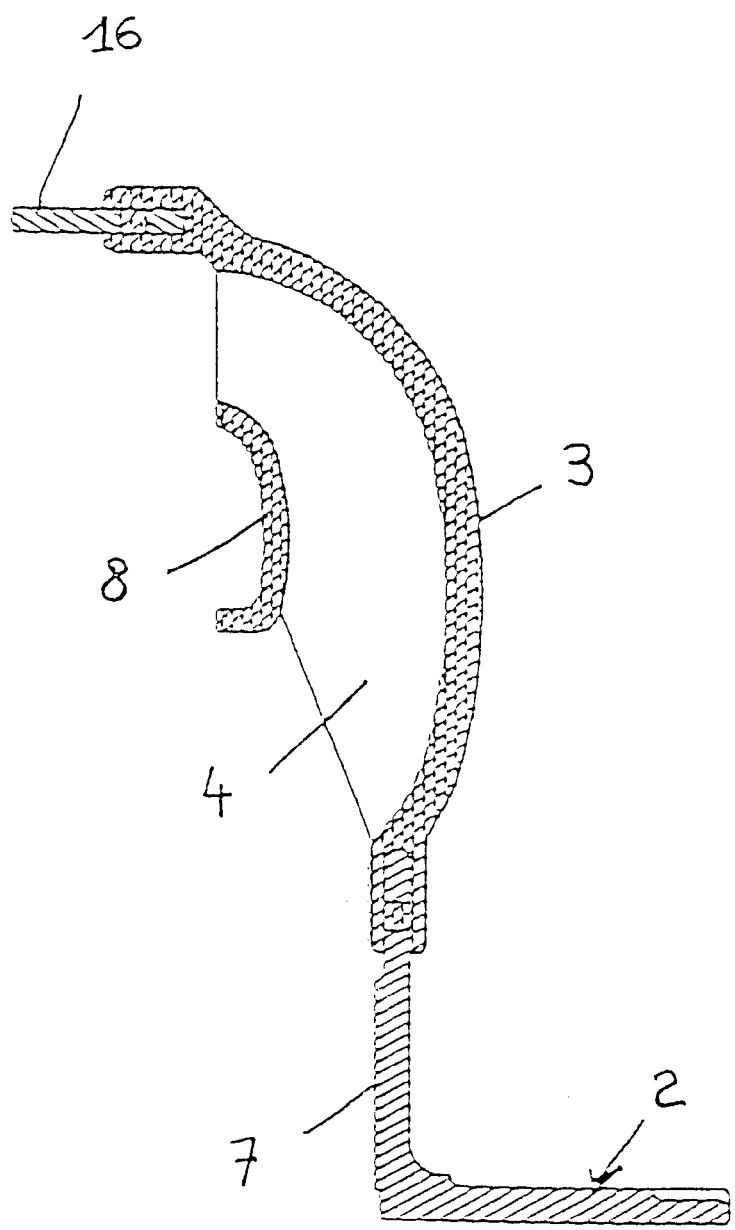

It can also be arranged that the outer toroidal portion 3 with its blades 4 is made of a synthetic material which is moulded in situ on an external metal shell 13, which is for example of steel as shown in FIG. 7, and this increases the rigidity of the bladed wheel 1. It is then possible to secure this assembly on the hub 2 by means of an inner edge 14 of the shell 13, welded at 15 on the radial plate portion 7 of the hub, with a circular row of rivets 5 (or bolts) fastening the outer toroidal portion 3, on this edge 14, to the outside of the peripheral edge of the radial plate portion 7. The inner toroidal portion is attached on the blades 4 of this assembly 13, 3, 4.

Figure 9:
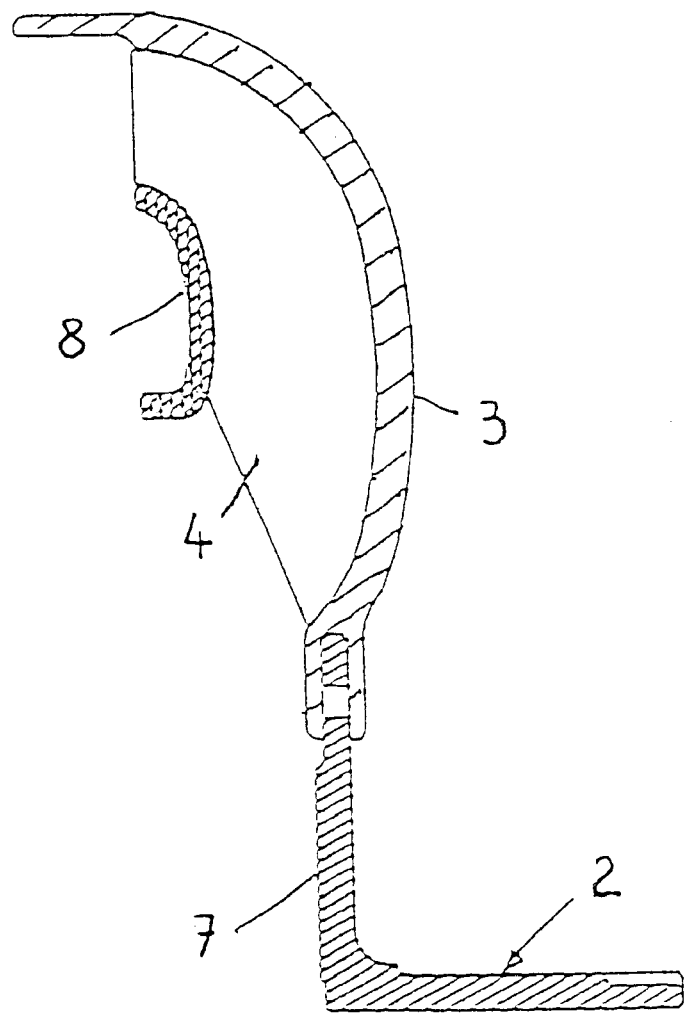
Figure 10:
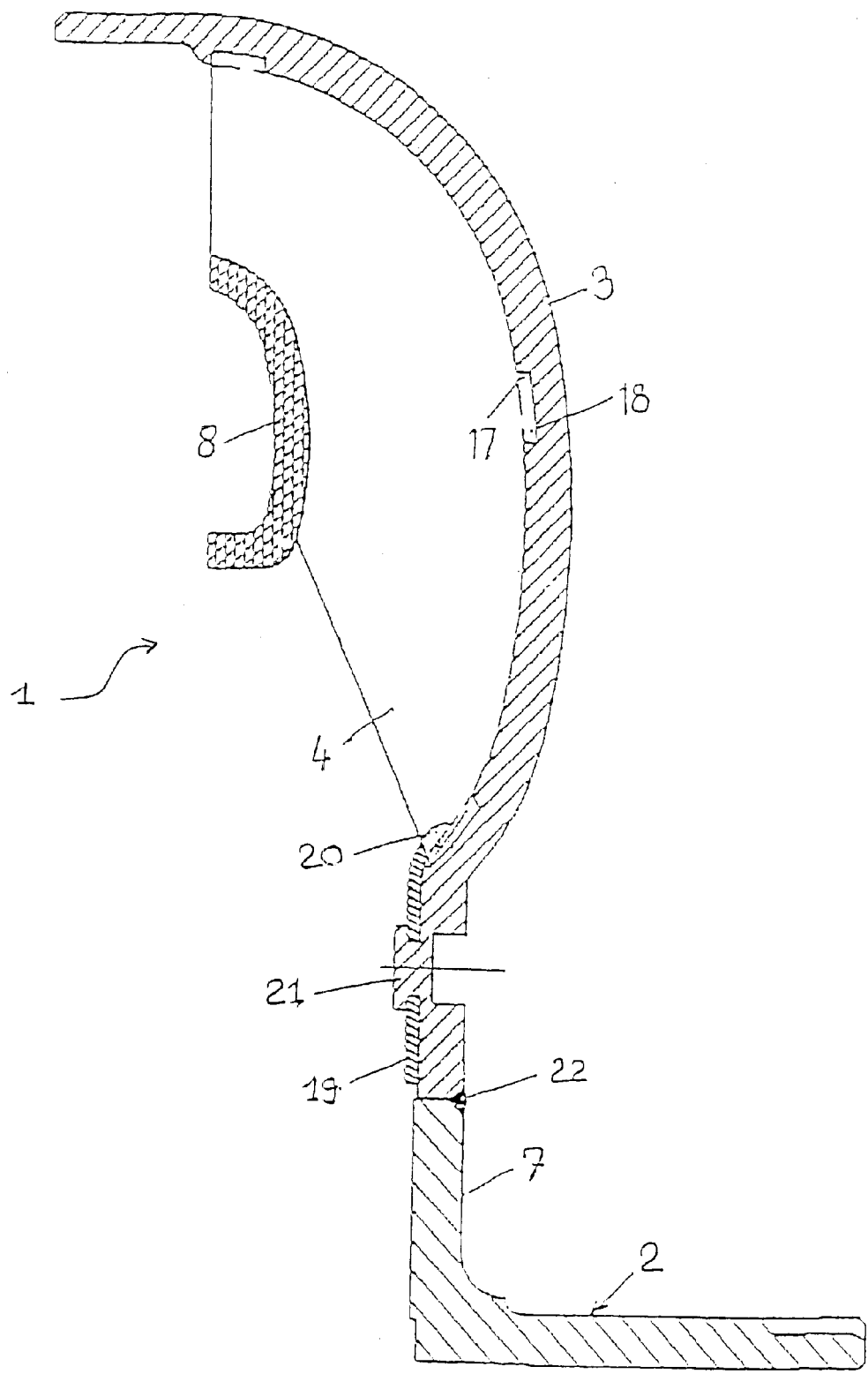
Figure 11:
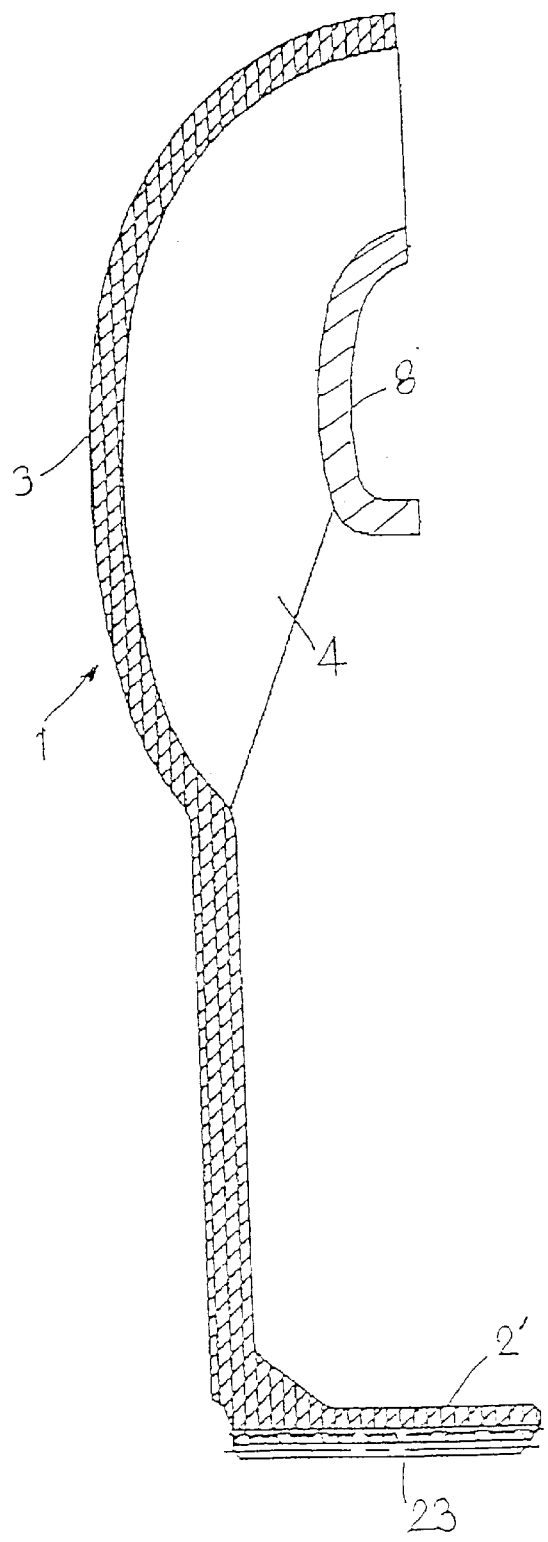
Figure 12:
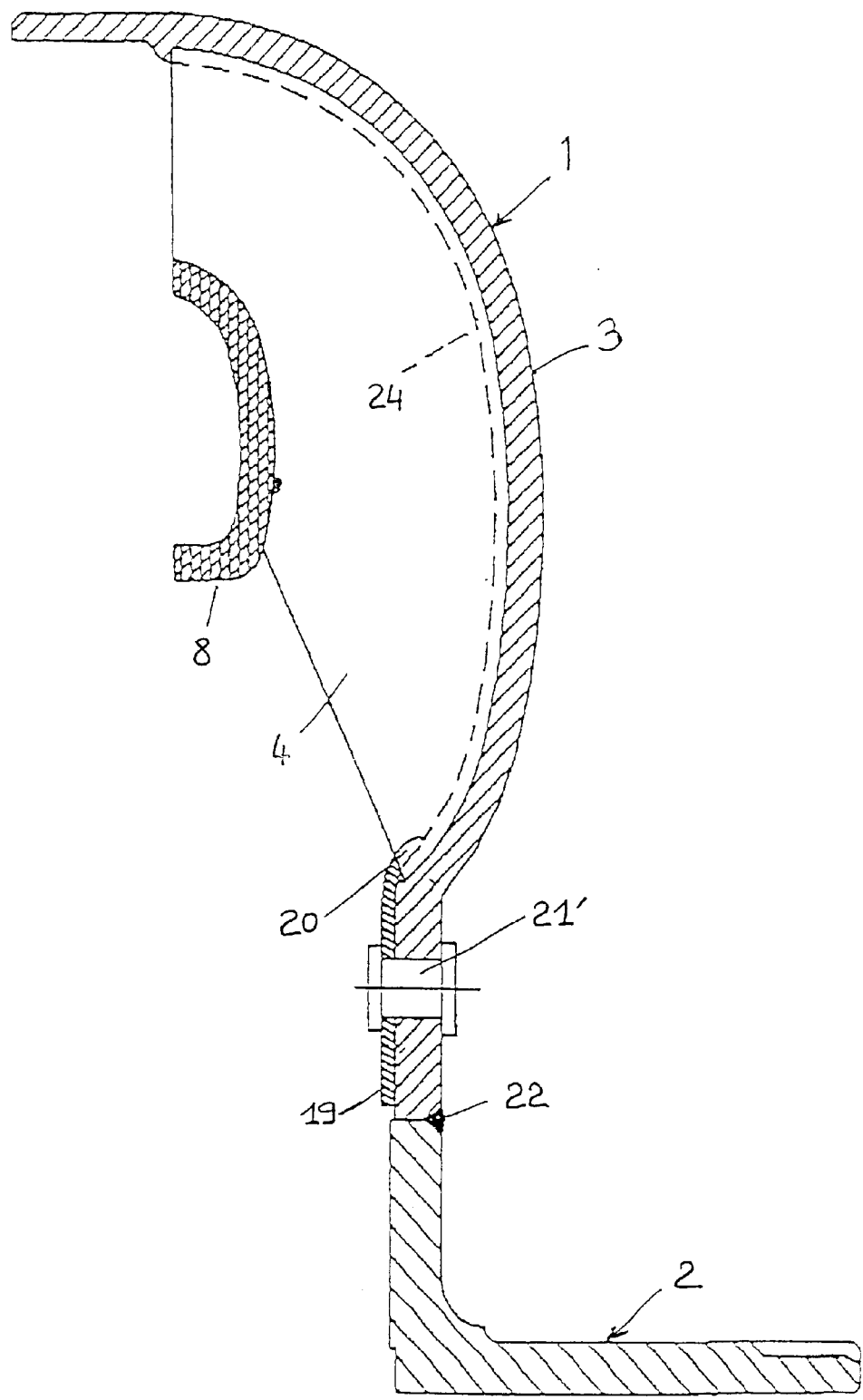

In the foregoing, and in FIG. 11, a general operation of moulding the outer toroidal portion 3 and blades 4 is supposed to have been carried out so as easily to form a sub-assembly, but it is also possible to envisage that a separate outer toroidal portion 3 may be provided, in a synthetic material or steel, which is attached on an assembly of the inner toroidal portion 8 and blades 4 moulded in one piece in the same type of synthetic material as those mentioned above, and as described below with reference to FIGS. 9, 10 and 12.

The invention further concerns various methods of assembly which can be used for securing the various portions of the bladed wheel 1 together.

In order to assemble together the various elements 3, 4, 8 of the bladed wheel 1, it is possible to use adhesive bonding, for example with a phenolic adhesive for thermosetting and thermoplastic materials or alloys, or welding, or any other type of heat generation such as ultrasonic welding, welding with indirect heating, for example with laser type welding, electromagnetic fields or high frequency currents or, again, with friction, vibration, riveting or upsetting, for thermoplastic materials.

It is also possible to use connections by means of metallic inserts disposed within the moulds, which can be welded.

As to the assembly of the bladed wheel 1, namely assembly of the turbine wheel with the steel turbine hub, and/or assembly of the impulse wheel with the hub which drives the pump, again of steel, this can be carried out by means of the in situ moulding shown in FIGS. 3, 4, 5a, 5b and 6, or again by standard riveting (FIGS. 1, 2, 7), or by screw or bolt fastening.

The various means set out as follows can also be envisaged:

snap-fastening: a profiled element fixed to the wheel 1 is introduced into a housing formed in the corresponding hub;

force-fitting: a pressure force is exerted between the two elements so that a mechanical force is transmitted;

upsetting: a head is formed (by application of heat or ultrasonically) on pegs which are provided at the foot of the turbine wheel and/or the impulse wheel, after the corresponding hub has been positioned.

Finally, the invention further concerns, in the case of an impulse wheel, the assembly of the latter with a cover plate or casing such as that indicated by the reference numeral 2 in the basic Application.

In particular, it is possible to proceed as follows:

by insertion into a steel shell of the assembly of the moulded impulse wheel, or an impulse wheel which does not have an outer toroidal portion but which does have an inner toroidal portion fixed to the blades, with notches being accordingly formed in the shell for receiving the blades, or, again, by in situ moulding of a steel crown 16 (FIG. 8) in the assembly consisting of the outer toroidal portion and the blades of the impulse wheel, so that the crown 16 enables the hydrokinetic coupling apparatus to be welded to the cover plate.

In the embodiment of FIG. 9, the inner toroidal portion 8 can be made integral with the blades 4, being moulded in one piece in a synthetic material in the manner described above. This can then be a thermoplastic or thermosetting resin, or an alloy of synthetic materials, and these materials may be reinforced with strengthening fibres such as glass, "Kevlar" or carbon fibres. The toroidal portion 8 is applied, for example by adhesive bonding, on a steel outer toroidal portion 3.

FIG. 10 shows an assembly consisting of the blades 4 and the inner toroidal portion 8 of the impulse wheel, which is moulded in one piece as in FIG. 9 and which is attached by clipping (or seaming) on an outer toroidal portion 3 of steel. For this purpose, the outer toroidal portion 3 includes seatings 17 on which tenons 18 of the blades 4 are engaged. Internally, a steel disc 19, with an outer edge slotted at 20 for receiving the blades 4, is secured by riveting on the outer toroidal portion or envelope 3 so as to retain internally the assembly consisting of the bladed wheel 1. The rivets shown at 21 are formed by extrusion of the outer toroidal portion 3 which is fixed to the hub 2 by welding, for example laser welding, in the region of its inner periphery at 22. The assembly is thereby sealed.

It should be noted that this arrangement would be applicable to the turbine wheel as well as the impulse wheel.

In the embodiment in FIG. 11, a turbine wheel 2 is shown which consists of two composite parts: the assembly that consists of the blades 4 and the outer toroidal portion 3, and the inner toroidal portion 8, the turbine wheel 2 having in this example been replaced by a splined sleeve 2', formed by in situ moulding or adhesive bonding on an internal insert 23, with an optional radial stop which is simple to make, for example by machining, moulding, press-forming, or otherwise.

This solution would also be applicable to the impulse wheel, but with, in this case, an external insert 23.

In the embodiment of FIG. 12, the moulded blades 4 with the toroidal portion 8 are fixed in rotation to the outer toroidal portion or envelope 3, for example by means of grooves 24 press-formed on the envelope 3 and receiving the outer edge of the said blades 4, or, for example, by means of press-formed notches, the impulse wheel or the turbine wheel being also identical or similar to that in FIG. 10 (with the extruded rivets 21 having been replaced here by sealed rivets 21').

Figure 13:
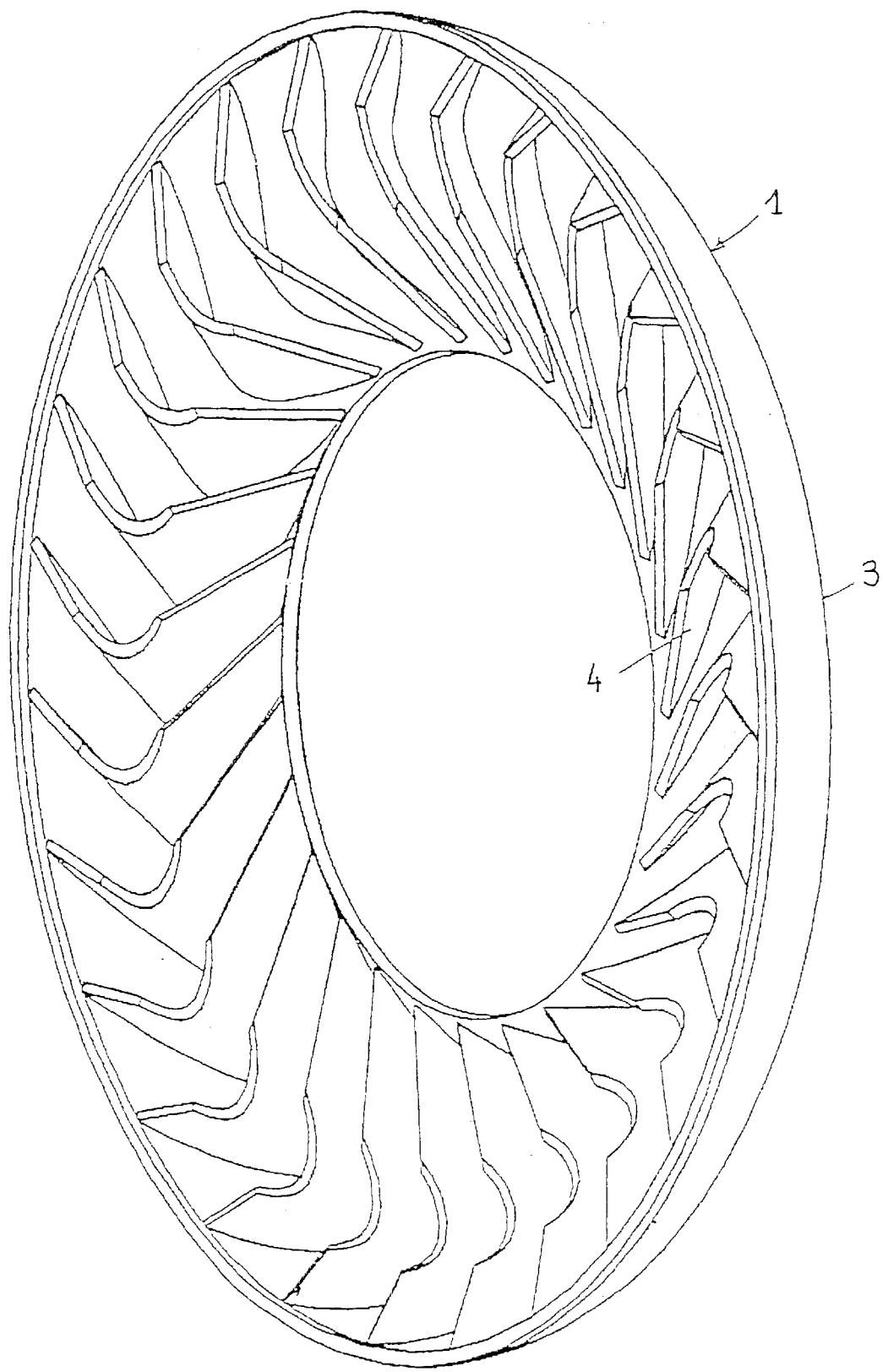

FIG. 13 shows an impulse or turbine wheel 1 with inclined blades 4. In particular, it is possible to give a particular form to the blades in order to enable the component to be stripped from the mould with a helical relative movement between the mould and the component. This embodiment is applicable to the versions shown in FIGS. 1 to 8 and 11. It is of course possible, by structural inversion, to proceed in a similar way in FIGS. 9, 10, 12.

Figure 14:
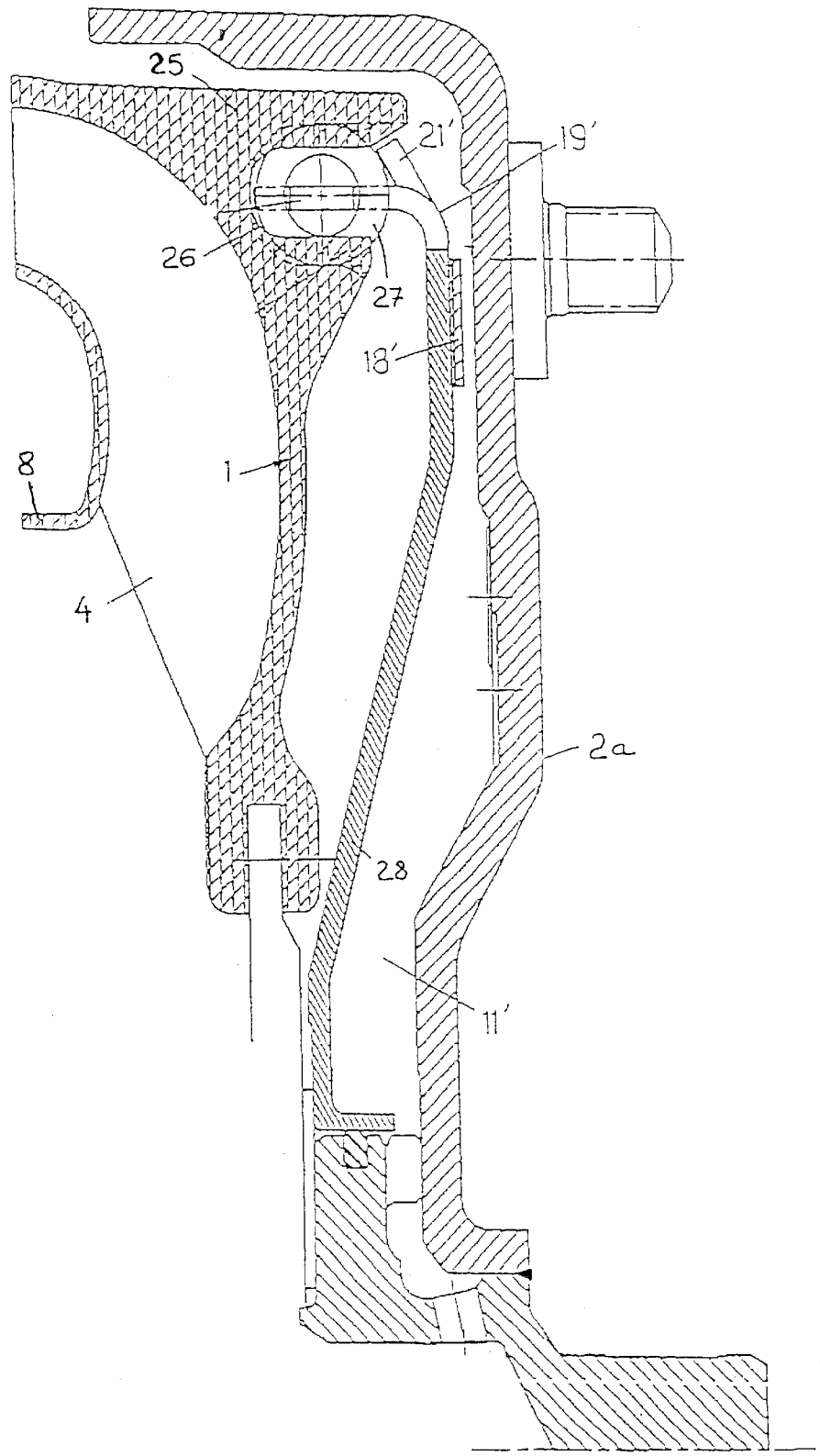
Figure 15:
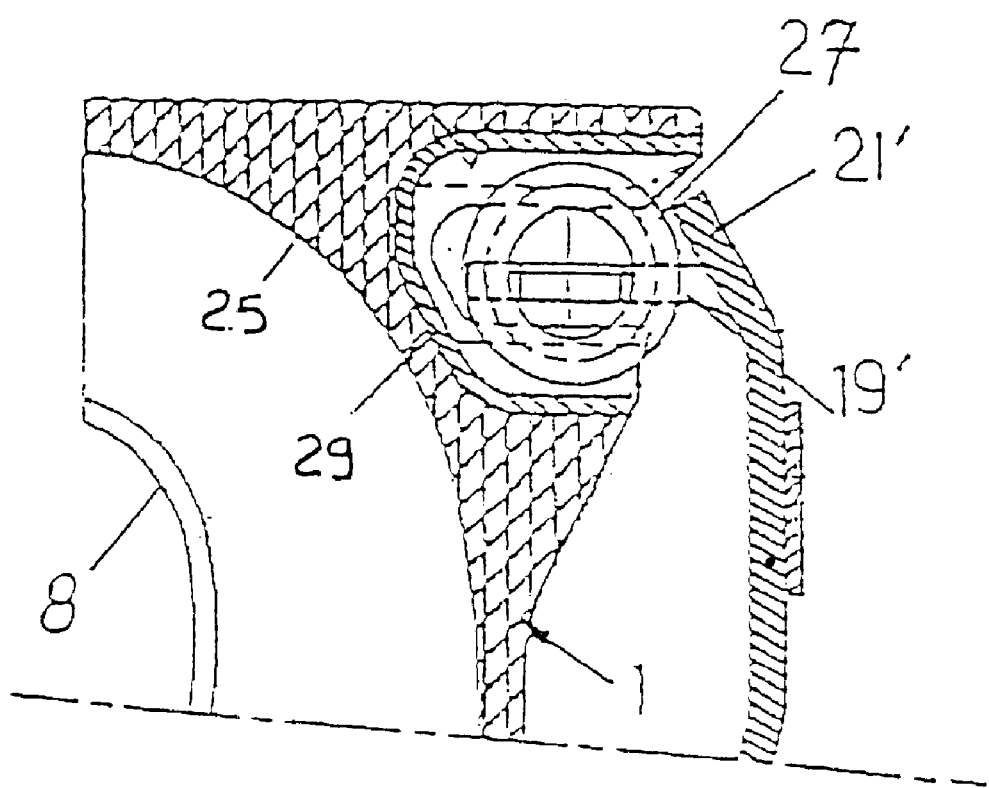

FIGS. 14 and 15, finally, correspond respectively to FIGS. 4 and 5 of the Application FR98.08674 of Jul. 7, 1998, showing a moulded to turbine wheel 1 having a peripheral portion thickened at 25, which enables it to contain arched seatings 26 for the springs 27 by which it is coupled with the clutch disc 28. The torus 8 is attached to the sub-assembly consisting of the outer torus 1 and blades 4 which is formed in the manner described above.

The operation of such a hydrokinetic coupling apparatus is known. An apparatus of this kind typically comprises a chamber 11' which contains a hydraulic fluid, the pressure of which is greater than that of the chamber 100, so that the liners 18' of the clutch disc 28 are held away from the radial wall 2a of the casing of the impulse wheel, so that the torque from the impulse wheel is transmitted to the turbine wheel 1 with sliding movement, by hydrokinetic effect alone in the said coupling apparatus, the springs 28 being then inactive. When on the other hand the pressure in the chamber 100 is greater than that in the chamber 11, the liners 18' then come into frictional engagement on the radial wall 26a, which causes the turbine wheel to be driven through profiled lugs 19' and 21' of the disc 28, and by the springs 27.

The version shown in FIG. 15 illustrates the possibility of providing the arched seatings in the, form of metallic inserts 29 on which the mouldable material of the turbine wheel 1 is applied by moulding, which prevents the springs 27 becoming embedded in this material under the effect of peripheral or centrifugal forces which are exerted on them in operation.

In FIGS. 14 and 15, the turbine wheel is coupled releasably, by virtue of the liner 18' fixed to the piston 28, to the portion of the casing 2a which is arranged to be coupled in rotation to the driving shaft, in this example by threaded components, one of which (not indicated with a reference numeral) can be seen in FIG. 14. In this Figure, the piston 28 is arranged at its outer periphery with profiled lugs 19' and 21' respectively, for engagement with the circumferential ends of the spring 27 and for retaining the springs radially in the manner described in the document FR98.02808 filed on Mar. 3, 1998.

In another version, the lugs 19', 21 ' are part of a disc interposed axially between the transverse wall of the casing part and the piston in the manner described in FIG. 1 of that document.

In FIG. 1, the rivets can of course be integral with the radial plate portion 7, being formed by extrusion. The thin portion 6 provides a backing plate for the annular inner periphery of the outer toroidal portion 3. In this case, the annular ring portion of the portion 3 is interposed between the plate portion 7 and a metallic annular ring, through both of which there pass rivets, the free ends of which are upset in contact with the said metallic annular ring.

The risk of leaks is reduced by virtue of the extruded rivets.

For more detail as to the impulse wheel, reference should be made for example to FIG. 1 of the document FR-A-2 634 849. It can be seen that, with solutions of the type shown in FIGS. 7, 9, 1 0, 1 2, it is possible to weld on the outer toroidal portion of the components 57 or 62 of the document FR-A-2 634 849, while having blades of plastics material.

The blades can of course be in two parts, each formed integrally by moulding with the outer and inner toroidal portions respectively, in the manner described above.

The two assemblies of the free ends of the blades are then fixed, for example by adhesive bonding, ultrasonic welding, laser welding, and so on as described above. This enables blades of complex form to be made.

What is claimed is:

1. Hydrokinetic coupling apparatus for a lock-up clutch apparatus comprising a turbine wheel coupled to a driven shaft and which is contained within a casing with which it is adapted to cooperate, for hydrokinetically transmitting a torque to the said driven shaft, from a driving shaft which is coupled with an impulse wheel, the impulse wheel being made in the form of a wheel (1) which comprises at least one of an outer toroidal portion (3) and an inner toroidal portion (8), together with blades (4) fixed to the said toroidal portion (3, 8), wherein the blades (4) and the toroidal portion (3, 8) are integrally moulded as a one piece homogeneous body of a synthetic material, which consists of at least one of a thermoplastic material, a thermosetting material, and an alloy of synthetic materials, and wherein said outer toroidal portion is integrally moulded to include an peripheral thickened portion (25) formed with a seating portion for receiving spring members of said lock-up clutch assembly.

2. Hydrokinetic coupling apparatus according to claim 1, characterised in that the said strengthening fibres are glass fibres, "Kevlar" fibres, or carbon fibres.

3. Hydrokinetic coupling apparatus according to claim 1, characterised in that the said bladed wheel (1) is fixed to a steel hub (2) and includes an outer toroidal portion (3) moulded in one piece with the blades (4).

4. Hydrokinetic coupling apparatus according to claim 3, characterised in that on the side opposite to the said outer toroidal portion (3), the said blades (4) are fixed together by means of an inner toroidal portion (8).

5. Hydrokinetic coupling apparatus according to claim 1, characterised in that the said bladed wheel (1) comprises an inner toroidal portion (8) and blades (4), the assembly, moulded in one piece, being fixed on an outer toroidal portion (3).

6. A hydrokinetic coupling apparatus according to claim 5, characterised in that the said assembly (4, 8) is fixed to the outer toroidal portion (3) by means of a system of cooperating tenons and seatings (17, 18).

7. Hydrokinetic coupling apparatus according to claim 5, characterised in that the said assembly (4, 8) is fixed to the outer toroidal portion (3) by means of grooves (24) which are press-formed in the outer toroidal portion (3) and which receive the outer edge of the said blades (4).

8. Hydrokinetic coupling apparatus according to claim 3, characterised in that, on the side opposite to the said outer toroidal portion (3), the said blades (4) are fixed together by means of a toothed crown (10), which is of a synthetic material consisting of a thermoplastic material, a thermosetting material or an alloy of synthetic materials, these materials being able to be reinforced with strengthening fibres, or which is of steel.

9. Hydrokinetic coupling apparatus according to claim 3, characterised in that, on the side opposite to the said outer toroidal portion (3), the said blades (4) are fixed together by means of a toothed disc (11), which is of a synthetic material consisting of a thermoplastic material, a thermosetting material or an alloy of synthetic materials, these materials being able to be reinforced with strengthening fibres, or which is of steel.

10. Hydrokinetic coupling apparatus according to claim 3, characterised in that, on the side opposite to the said outer toroidal portion (3), the said blades (4) are fixed together by means of a toothed and profiled crown (12), which is of a synthetic material, which is a thermoplastic material, a thermosetting material or an alloy of synthetic materials, these materials being able to be reinforced with strengthening fibres, or which is of steel.

11. Hydrokinetic coupling apparatus according to claim 3, characterised in that the outer toroidal portion (3) with its blades (4) consists of a synthetic material moulded in situ, in one piece, on an external metal shell (13).

12. Hydrokinetic coupling apparatus according to claim 1, characterised in that the outer toroidal portion (3) with its blades (4) is fixed by means of a crown of rivets or bolts (5) on a thin peripheral portion (6) of a radial plate portion (7) of the said hub (2).

13. Hydrokinetic coupling apparatus according to claim 1, characterised in that the hub (2) includes, in a thin peripheral portion (6) of a radial plate portion (7), a set of recesses (9) which, during the moulding operation, are filled with a synthetic material of the said outer toroidal portion (3), thereby securing the assembly of the latter, with the blades (4), on the said hub.

14. Hydrokinetic coupling apparatus according to claim 1, characterised in that the outer toroidal portion (3), with its blades (4), is secured by welding (22) on a radial plate portion (7) of the said hub (2), with a disc (19) having a slotted outer edge (20) for receiving the blades (4), being secured by riveting (21) on the said outer toroidal portion (3).

15. Hydrokinetic coupling apparatus according to claim 14, characterised in that the said riveting (21) is carried out by extrusion of the said outer toroidal portion (3).

16. Hydrokinetic coupling apparatus according to claim 11, characterised in that fastening of the assembly of the outer toroidal portion (3) and its blades (4) on the said hub (2) is obtained by means of an inner edge (14) of the said metal shell (13), welded on a radial plate portion (7) of the hub, with a row of rivets or bolts (5) fastening the said outer toroidal portion (3) on the said inner edge (14).

17. Hydrokinetic coupling apparatus according to claim 1, characterised in that the said outer toroidal portion (3) is moulded in one piece with a splined sleeve (2') which is moulded in situ or adhesively bonded on an internal insert (23) for a turbine wheel, or on an external insert for an impulse wheel.

18. Hydrokinetic coupling apparatus according to claim 1, characterised in that the various elements (3, 4, 8) of the bladed wheel (1) are assembled together by adhesive bonding.

19. Hydrokinetic coupling apparatus according to claim 1, characterised in that the various elements (3, 4, 8) of the bladed wheel (1) are assembled together by application of heat.

20. Hydrokinetic coupling apparatus according to claim 1, wherein the bladed wheel (1) is an impulse wheel, characterised in that it is assembled with an impulse wheel cover plate by in situ moulding of a crown (16) in the assembly that consists of the outer toroidal portion (3) and blades (4) of the said impulse wheel, permitting welding to the said cover plate.

21. Hydrokinetic coupling apparatus according to claim 1, characterised in that the blades (4) are inclined so as to permit stripping from the mould with helical relative movement between the mould and the component.

* * * * *

UNITED STATES PATENT AND TRADEMARK OFFICE
CERTIFICATE OF CORRECTION

PATENT NO. : 6,428,276 B1  Page 1 of 1
APPLICATION NO. : 09/508004
DATED : August 6, 2002
INVENTOR(S) : Chasseguet et al.

It is certified that error appears in the above-identified patent and that said Letters Patent is hereby corrected as shown below:

Column 6, line 38 (line 6 of claim 1), please change "impulse" (second occurrence) to --turbine--.

Signed and Sealed this

Seventh Day of July, 2009

JOHN DOLL
*Acting Director of the United States Patent and Trademark Office*